United States Patent [19]

Morgan

[11] Patent Number: 4,722,662
[45] Date of Patent: Feb. 2, 1988

[54] VAPOR EMISSION CONTROL SYSTEM FOR PUMPS

[75] Inventor: Michael L. Morgan, Sunnymead, Calif.

[73] Assignee: Atlantic Richfield Company, Los Angeles, Calif.

[21] Appl. No.: 875,119

[22] Filed: Jun. 17, 1986

[51] Int. Cl.⁴ ............................................. F01D 25/32
[52] U.S. Cl. ................................ 415/168; 415/121 A; 415/118; 415/201
[58] Field of Search ............... 415/201, 111, 112, 168, 415/169 R, 170 R, 121 A, 175, 176, 118

[56] References Cited

U.S. PATENT DOCUMENTS

| | | | |
|---|---|---|---|
| 1,234,948 | 7/1917 | Sperry | 415/201 |
| 1,727,703 | 9/1929 | Hause et al. | 415/201 |
| 1,840,127 | 1/1932 | Penney | 415/112 |
| 2,999,702 | 9/1961 | Dunn et al. | 277/83 |
| 3,273,509 | 9/1966 | Margus | 415/112 |
| 3,370,542 | 2/1968 | Harney | 415/169 |
| 3,532,444 | 10/1970 | Strub | 415/112 |

*Primary Examiner*—Robert E. Garrett
*Assistant Examiner*—John T. Kwon
*Attorney, Agent, or Firm*—Michael E. Martin

[57] ABSTRACT

Centrifugal pipeline pumps for crude oil and other hydrocarbon liquids are provided with removable cover members between the seal housing portions of the pump casing and the outboard bearing housing portions of the pump, which cover members have vapor adsorption filters supported thereon and in fluid flow communication with the pump fluid leakage collection spaces formed between the pump shaft seal housings and the pump shaft bearing housings. The cover members and vapor adsorption units may be easily removed from the pump casing in assembly to provide access to the pump shaft seals for inspection or repair.

5 Claims, 3 Drawing Figures

VAPOR EMISSION CONTROL SYSTEM FOR PUMPS

BACKGROUND OF THE INVENTION

1. Field of the Invention

The present invention pertains to a vapor and liquid emission control system for controlling the seal leakage of pumps, such as crude oil and petroleum product pumps.

2. Background

Certain types of high volume throughput pumps are constructed in such a way as to have opposed mechanical seals for preventing the escape of pump working fluid from opposite ends of the pump shaft. In particular, crude oil and petroleum product centrifugal pumps are constructed in such a way that the main impeller shaft is supported by bearings which are disposed outboard of opposed mechanical seal assemblies. The pump bearing housing and seal support housings are configured in such a way that the seals may be removed from the pump shaft without disassembling the pump, or at least moved away from their working position for inspection and repair. In this regard, the pump housing is constructed with a seal access space which is normally open to atmosphere or may be partially closed by a removable cover member. The pump working liquid and any vapors emitting therefrom may leak through the seals and present an environmental hazard. The present invention provides a system for minimizing the leakage of fluids from centrifugal crude oil and petroleum product pipeline pumps and the like with a view to minimizing the uncontrolled leakage or emission of liquids and vapors from such types of pumps.

SUMMARY OF THE INVENTION

The present invention provides an improved emission control system for use in conjunction with crude oil and petroleum product pipeline pumps as well as similar types of pumps for applications wherein all phases of the pump working fluid must be prevented from escaping uncontrolled into the environment in which the pump is operating. In accordance with one important aspect of the present invention, an improved vapor emission seal arrangement is provided for single or multi-stage centrifugal pipeline pumps of a type having mechanical seal assemblies disposed around the impeller shaft on one or both sides of the impeller volute or housing and spaced inboard of one or more shaft support bearings. In particular, the present invention provides for a removable cover which permits access to the pump seal housing and which is provided with means for absorbing hydrocarbon vapor emissions. The cover is easily removable from the pump seal housing for access to the seals for inspection and/or repair thereof. Moreover, the removable seal cover also prevents the uncontrolled discharge of liquid leaking from the pump working chambers or the pump bearing housings.

In accordance with another important aspect of the present invention, there is provided a vapor and liquid emission control system for pumps operating with crude oil or other hydrocarbon fluids whereby the forced flow of fluid vapor to a liquid reclaiming tank or sump is prevented while at the same time the emission of such vapor into the atmosphere is also substantially precluded by forcing the flow of such vapor through a suitable vapor adsorption unit mounted on a removable cover supported on the pump between the main pump casing and an outboard bearing housing or the like.

Those skilled in the art will recognize the above-described features and advantages of the present invention, as well as other superior aspects thereof upon reading the detailed description which follows in conjunction with the drawing.

DESCRIPTION OF A PREFERRED EMBODIMENT

Figure 1:
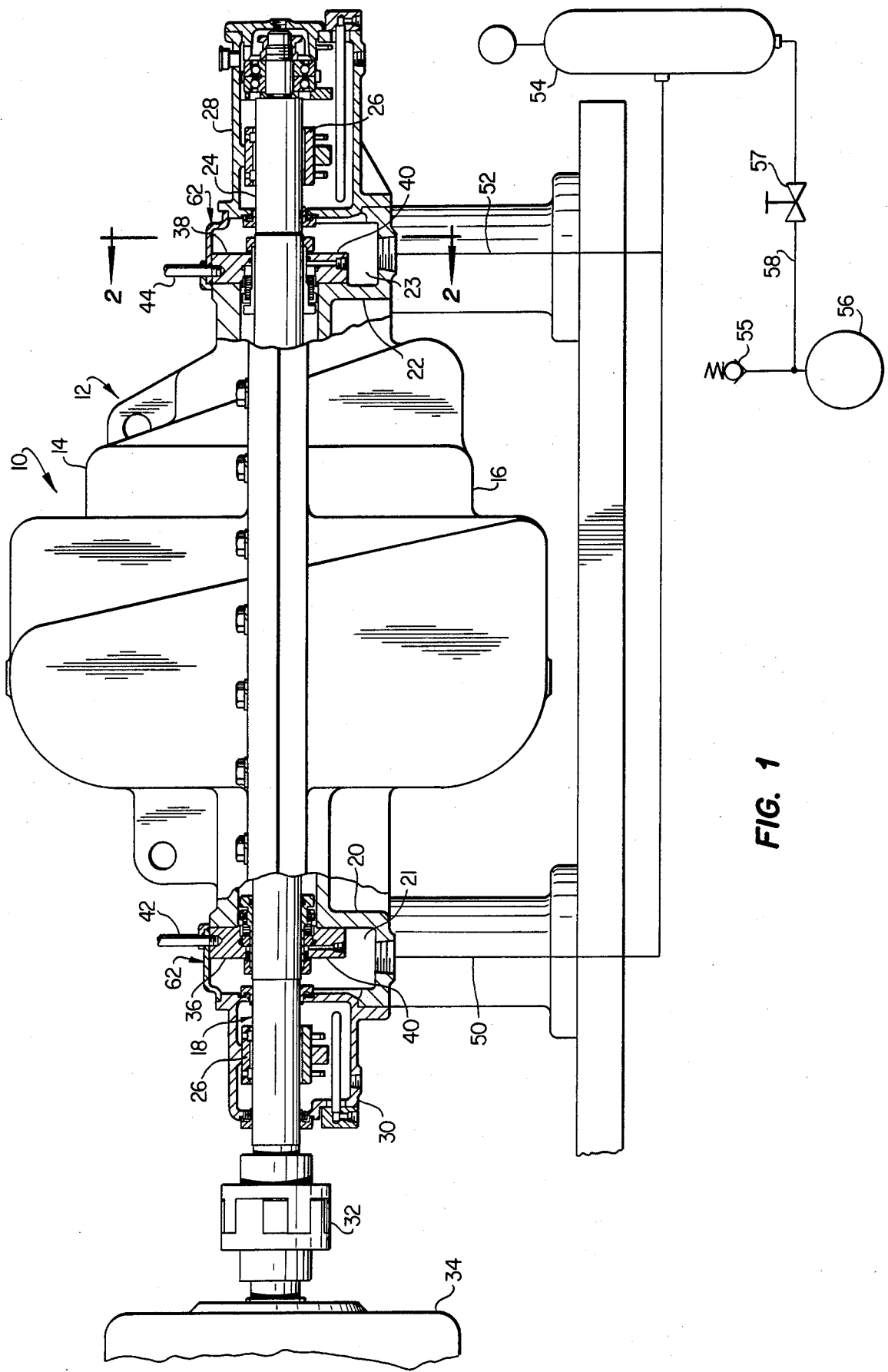
FIG. 1 is a side elevation, partially sectioned, of a multi-stage centrifugal pipeline pump, including the improved emission control system of the present invention.

In the description which follows like parts are marked throughout the specification and drawing with the same reference numerals, respectively. The drawing figures are not necessarily to scale.

Referring to FIG. 1, there is illustrated a multi-stage centrifugal high volume flow rate pump 10 of the type typically used for pumping crude oil and liquid petroleum products. The pump 10 is typically characterized by an axially split casing 12 having opposed casing sections 14 and 16 which house one or more centrifugal impellers, not shown, and which are mounted on an elongated impeller shaft generally designated by the numeral 18. The casing 12 includes opposed shaft seal support housing sections 20 and 22 which are each provided with a recess or sump portion 21 and 23, respectively, for collecting liquids being pumped by the pump 10 and which leak past respective seal assemblies to be described in further detail herein. The shaft 18 includes a distal end 24 which is supported in a suitable bearing 26 disposed in a bearing housing section 28 outboard of the seal housing section 22 of the casing 12. A second bearing 26 is disposed in a bearing housing section 30 outboard of the pump casing 12 with respect to the seal housing section 20. The shaft 18 is suitably connected by way of a coupling 32 to a prime mover such as an electric motor 34.

The arrangement of the pump 10 is such as to have a space formed between each of the seal housings 20 and 22 and the respective bearing housings 30 and 28 to provide for access to opposed mechanical seal assemblies 36 and 38, each of which includes a suitable seal housing or gland 40. Seal flushing liquid is supplied to the respective glands 40 through suitable conduits 42 and 44 from a source, not shown. Flushing liquid which is discharged from the seals and which leaks from the pump casing through the seals may fall into the spaces 21 and 23 for collection by a suitable leakage emission control system including conduits 50 and 52 which are connected to a seal leakage detection unit 54. The detection unit 54 may be of a type commercially available, such as a type B74-1B20-ANY, manufactured by Magnetrol International of Downers Grove, Ill. Liquids leaking from the pump casing 12 through the seal assemblies 36 and 38 and as a result of leakage of flushing liquid are discharged from the leak detection unit 54 into a suitable sump 56. The sump 56 is suitably vented through a one way valve 55, for example, to prevent reverse flow of liquid through the leak detection unit 54 and into the spaces 21 and 23. A valve 57 is typically interposed in a conduit 58 between the leakage flow detection unit 54 and the sump 56 to provide for a controlled leakage rate from the pump 10 and when this leakage rate is exceeded, accumulation of liquid in the leakage flow detection unit 54 triggers an alarm so that remedial action can be taken.

The pump 10 is typically adapted for pumping crude oil through various kinds of transmission pipelines and the like. The emission of vapors from the working fluid being pumped by the pump 10 as well as the seal flushing liquid from the spaces 21 and 23 to atmosphere should be minimized to comply with certain governmental regulations. However, access to the seal assemblies 36 and 38 must also be provided so that these seal assemblies may be periodically inspected, repaired or replaced as needed to prevent excess leakage of working fluid from the pump casing 12. In this regard, improved vapor control cover means are provided for closing the spaces 21 and 23 between the respective seal housing 20 and 22 and the respective bearing housings 30 and 28. The improved cover members are each designated by the numeral 62 and one of these cover members will be described in further detail herein, by way of example, in conjunction with FIGS. 2 and 3 of the drawing.

Figure 2:
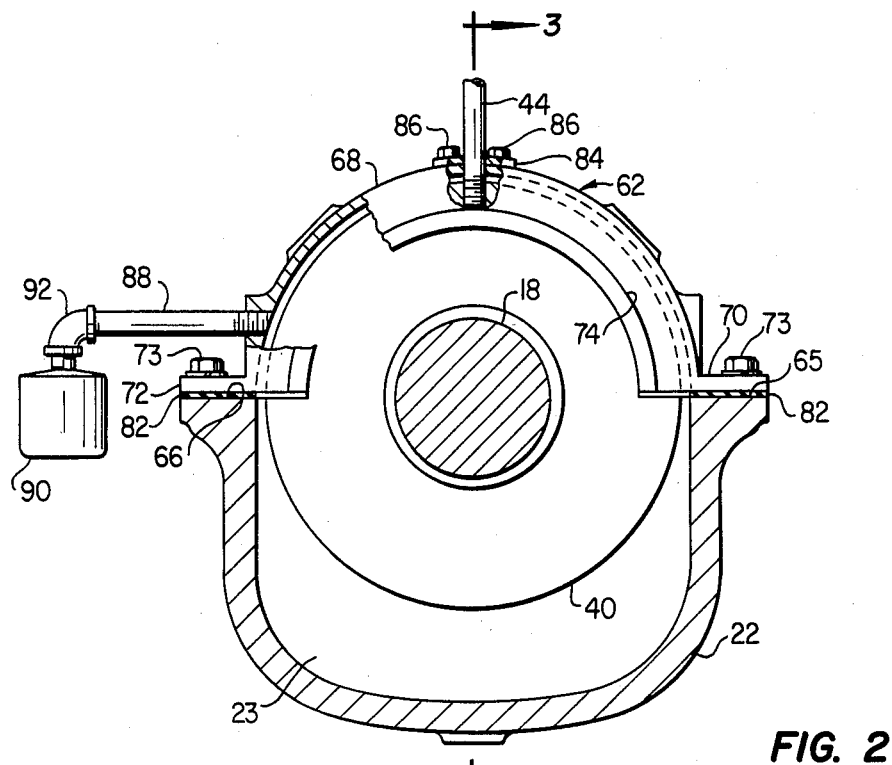
FIG. 2 is a section view taken substantially along the line 2—2 of FIG. 1.
Figure 3:
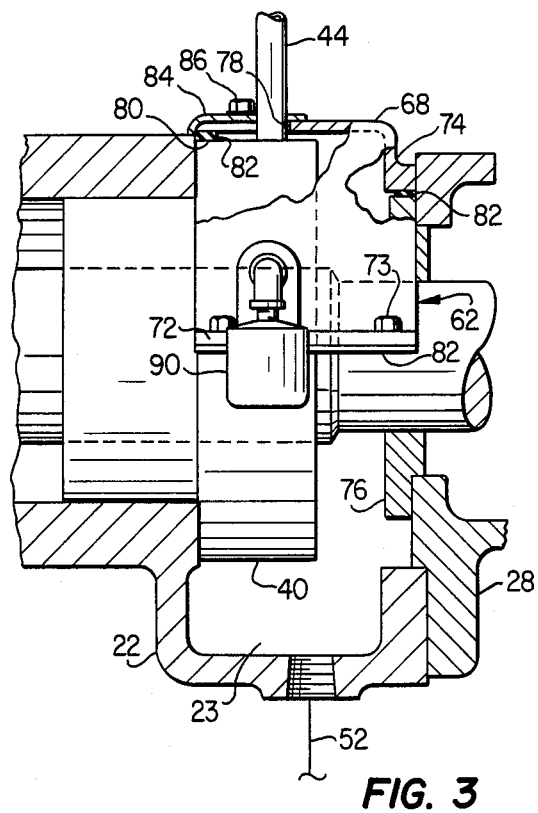
FIG. 3 is a section view taken substantially along the line 3—3 of FIG. 2.

Referring to FIGS. 2 and 3, the outboard seal housing section 22 of the casing 12 is illustrated in assembly with its cover 62. The space 23 is partially delimited by opposed upward facing flange portions 65 and 66 of the seal housing section 22. The cover 62 comprises a generally semi-cylindrical body portion 68 and opposed support flanges 70 and 72 which are adapted to be contiguous with the respective flanges 65 and 66 and secured thereto by threaded fasteners 73. As shown in FIG. 3, an arcuate flange portion 74 is formed as part of the cover body 68 and is adapted to be contiguous with a removable support housing 76 for a second shaft seal or splash guard which separates the interior of the bearing housing 28 from the space 23. An elongated slot 78 is formed in the cover body 68 to permit installation and removal of the cover 62 without removal of the flushing liquid supply conduit 44 from the seal gland 40.

The cover body 68 also includes a seal surface 80 formed around the periphery thereof and which is adapted to be in sealing engagement with the gland 40 through a suitable gasket or resilient sealing medium 82. A small cover member 84 is adapted to fit over the slot 78 between the conduit 44 and the mouth of the slot to close that portion of the slot which is not occupied by the conduit 44 when the cover 62 is in place on the housing 22 as illustrated in the drawing figures. Suitable threaded fasteners 86 are provided for securing the cover 84 to the cover body 68. The sealing medium 82 may be a continuous gasket which is interposed between the flange 74 and the splash guard or seal body 76 as well as interposed between the seal surface 80 and the seal gland 40. The sealing medium or gasket 82 may also extend between the flanges 70 and 72 and their matching flange surfaces 65 and 66. A suitable sealing medium may be a silicone sealant or an inlaid rubber gasket or o-ring type seal.

In order to prevent the accumulation of vapor within the space 23 or conduction of a substantial amount of vapor through the conduits 50 and 52 and into the leakage detection unit 54 and eventually the sump 56, the cover 62 is provided with a unique vapor scrubbing or purification arrangement, including a conduit 88 which is secured to the cover body 68 and projects laterally from the side thereof, see FIG. 2. The conduit 88 is in communication with a vapor adsorption unit 90 through a downturned conduit fitting 92. The vapor adsorption unit 90 may comprise a cannister of activated carbon. The vapor adsorption unit 90 may be of a type commercially available such as a Model DFO Activated Carbon Filter manufactured by Koby, Inc., Marlboro, Mass.

Thanks to the provision of the covers 62 which cover the spaces 21 and 23 of the seal housing sections of the casing 12, any vapors emitted through the seal assemblies 36 are adsorbed by the adsorption unit 90 and do not flow through the liquid leakage collection system, including the leak detection unit 54 and the sump 56. Moreover, each of the covers 62 may be easily removed for inspection, repair or replacement of the seal assemblies 36 without disassembly of the pump casing 12. The overall arrangement of liquid and vapor leakage containment or control means described herein for the pump 10 minimizes the chance of unwanted emissions of vapors or liquids which are of a toxic or declared to be harmful nature. Moreover, the particular arrangement shown is believed to comply with the relatively stringent emission control requirements of many governmental authorities including various state and federal regulatory authorities in the United States. Those skilled in the art will recognize that the covers 62 as applied to both portions of the casing 10 as illustrated in FIG. 1 are substantially identical and a detailed description hereinabove for the installation of the cover 62 between the housings 22 and 28 is exemplary of both cover installations.

Although a preferred embodiment of the invention has been described herein in detail, those skilled in the art will recognize that various substitutions and modifications may be made to the specific embodiment described without departing from the scope and spirit of the appended claims.

What I claim is:

1. A fluid emission control system for a pump, said pump including a casing having a portion defining a seal housing for a shaft of said pump, a bearing housing for supporting said shaft on bearing means disposed in said bearing housing, said bearing housing being disposed outboard of said seal housing with respect to said casing and defining with said seal housing a space for a seal gland or the like, conduit means in communication with said space for draining liquid leaking into said space through said seal housing, and a sump for receiving liquid leakage flow from said space, cover means forming a closure for said space, said cover means being removably supported on said pump between said seal housing and said bearing housing, and a vapor adsorption cannister supported on said cover means and in fluid flow communication with said space for adsorbing vapors emitted from said pump into said space and operable to substantially equalize the pressure in said space with ambient atmospheric pressure around said pump and without substantial accumulation of vapors in said sump from said space.

2. The system set forth in claim 1 wherein:
said cover means includes a substantially arcuate cover member having opposed flanges engagable with cooperating flange surfaces on said casing, and seal means interposed between said cover member and said casing and forming a substantially vapor tight seal therebetween.

3. The system set forth in claim 1 wherein:

said adsorption means comprises an activated carbon filter unit in communication with said space for adsorbing vapors emitted through said seal housing and said space from said pump.

4. The system set forth in claim 3 wherein:

said cover member is disposed around said seal housing in such a way as to prevent the ejection of liquid leakage from said seal housing from said casing.

5. The system set forth in claim 4 wherein:

said cover member includes a slot opening to one side of said cover member for receiving a flushing liquid conduit connected to said seal housing to provide for installation and removal of said cover member from said seal housing without removal of said flushing liquid conduit therefrom, and a second cover member removably connected to said cover member for closing said slot.

* * * * *